United States Patent

Pomp

Patent Number: 5,312,207
Date of Patent: May 17, 1994

[54] CYLINDRICAL BIT

[75] Inventor: Thomas Pomp, Remscheid, Fed. Rep. of Germany

[73] Assignee: Famag-Werkzeugfabrik Friedr. Aug. Mühylhoff, Remscheid, Fed. Rep. of Germany

[21] Appl. No.: 879,362

[22] Filed: May 7, 1992

[30] Foreign Application Priority Data

May 8, 1991 [DE] Fed. Rep. of Germany ........ 4115030

[51] Int. Cl.⁵ .............................................. B23B 51/00
[52] U.S. Cl. ...................................... 408/212; 408/213; 408/225
[58] Field of Search ............... 408/227, 229, 230, 214, 408/225, 212, 213; 144/240, 241

[56] References Cited

U.S. PATENT DOCUMENTS

| 41,517 | 2/1864 | Low | 408/230 |
|---|---|---|---|
| 3,180,379 | 4/1965 | Stewart | |
| 4,012,970 | 3/1977 | Hintz et al. | |
| 4,565,473 | 1/1986 | Hosoi | 408/229 |

FOREIGN PATENT DOCUMENTS

| 8808954 | 11/1988 | Fed. Rep. of Germany | |
|---|---|---|---|
| WO89/00097 | 12/1989 | PCT Int'l Appl. | |
| 1569102 | 6/1990 | U.S.S.R. | 408/230 |
| 194542 | 3/1922 | United Kingdom | |
| 193786 | 8/1922 | United Kingdom | |
| 2219229 | 2/1989 | United Kingdom | |

Primary Examiner—Daniel W. Howell
Attorney, Agent, or Firm—Antonelli, Terry, Stout & Kraus

[57] ABSTRACT

A cylindrical bit including a drill head with a centering tip, two circumferential cutters, two main cutting edges extending approximately radialy, and two chip channels associated with main cutting edges. The chip channels are open toward a circumferential surface and toward a rear of the cylindrical bit. To improve chip removal, each chip channel bottom surface is rounded in a curved fashion and blends continuously with the respective chip surfaces of the corresponding main cutting edges and with chip channel side walls opposite the respective chip surfaces.

7 Claims, 4 Drawing Sheets

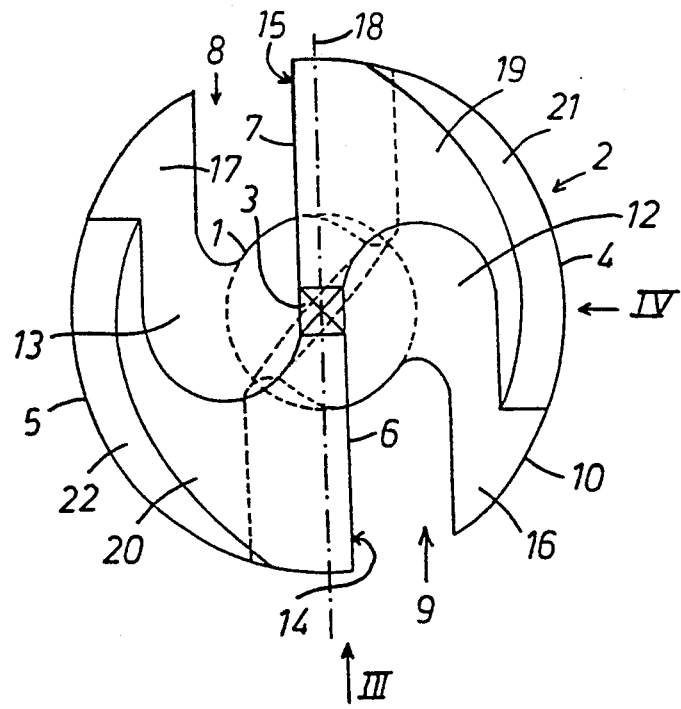
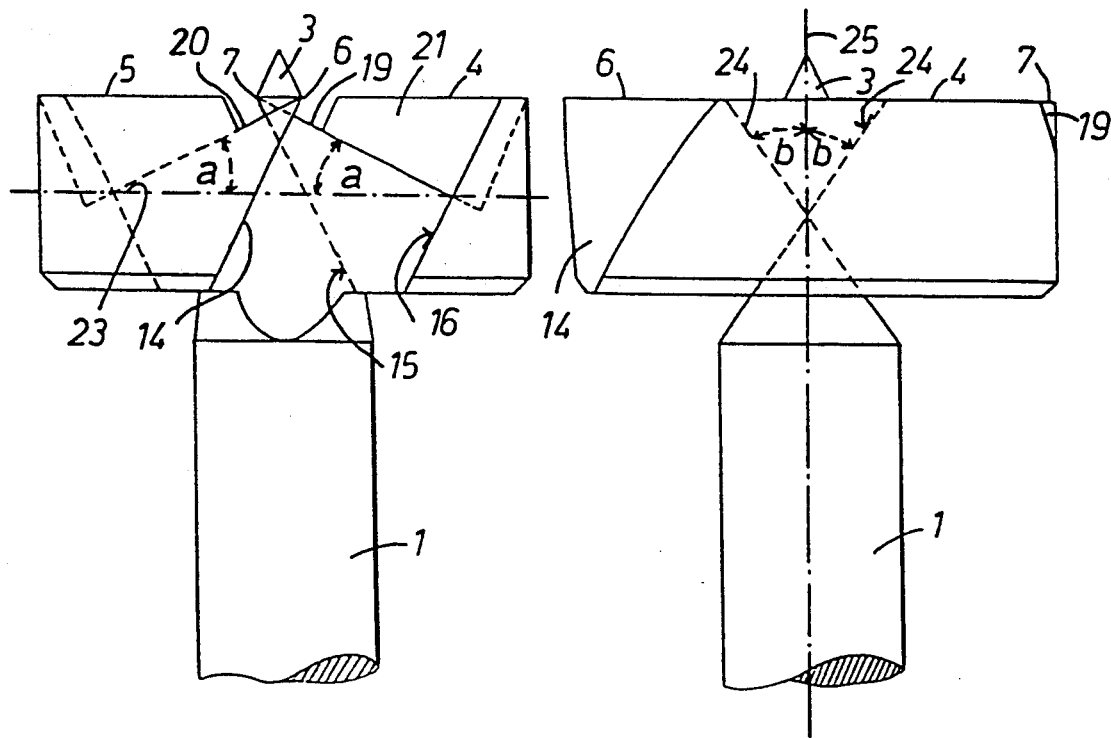

CYLINDRICAL BIT

FIELD OF THE INVENTION

The present invention relates to a one-piece cylindrical bit fashioned of a solid material, with a drilling head mounted on a shank, with the head being provided with a centering tip and having two circumferential cutters, two main cutting edges extending essentially radially and two chip channels associated with the main cutting edge which channels open toward a circumferential surface and to a rear of the drilling head.

BACKGROUND OF THE INVENTION

One-piece cylindrical bits of the above-mentioned type, used primarily to machine wood or plastic, have been known for decades in various embodiments, and are, for example, shown "Drilling and Milling Tools," 1990, FAMAG-Werkzeugfabrik Friedr. Aug. Muehlhoff, Remscheid.

Depending upon the length of the circumferential cutters, a distinction is made between Forstner bits and knothole cutters, which have especially long circumferential cutters, and so-called multispur machine bits in which the circumferential cutters, generally termed precutters, each extend over only about one-tenth to one-twelfth of the circumference of the drill bit. Spaces and channels to carry away the chips that are produced must be provided for both the main cutters and for the circumferential cutters. Proposed cylindrical bits have proven to be very good in service, but chip removal poses problems when deeper holes must be made with the holes being impossible to make in one work step, but only with intermediate removal of the bit from the hole, since known one-piece cylindrical bits have relatively polygonal spaces machined in the drilling head, in which chips can accumulate.

In, for example, U.S. Pat. No. 4,090,807, a cylindrical bit made in several parts is provided with a central piece threadably inserted into an end of the shank, into which piece a centering tip is in turn threadably inserted in turn. On the sloping lateral surfaces of the centering tip, two plates bearing the main cutters are welded, with each plate having, at its rear, an approximately semicircular radially projecting segment welded in place, on which precutters are formed. The radially projecting segments are fashioned as relatively flat disks and provided with radial corner recesses delimited in each case by the plate of the other main cutter to form a chip removal opening. The bottom of the chip removal opening, located radially inward, is rounded in an arcuate shape. The flat design of the segments does reduce problems associated with chip removal, but this is accomplished at the expense of the stability of the cylindrical bit. The main cutters and precutters project roughly at right angels beyond the ends of the segments and, in turn, form polygonal chambers in which chips can accumulate. Moreover, this multipart cylindrical bit is very expensive the manufacture.

In, for example, U.S. Pat. No. 3,945,753, another cylindrical bit is threadably assembled from five parts, in which beam-shaped main cutters are provided, on whose radially external corners small axially projecting precutters are milled. Both the main cutters and the precutters project only slightly beyond a slightly roof-shaped end of the drilling head, so that very narrow spaces are produced in which chips can readily accumulate. This known drill is not suitable for drilling deep holes in one work step and is also very expensive to manufacture.

SUMMARY OF THE INVENTION

The aim underlying the invention resides in providing a cylindrical bit in which even deeper holes can be made in one work step without removing the drill, and which is inexpensive to manufacture.

In accordance with the present invention, a cylindrical bit is provided wherein each chip channel bottom is rounded in an arcuate form and makes a continuous transition both to the chip surface of the associated main cutter and also to the chip channel side wall opposite this chip surface, and with the exposed surfaces of the main cutters being flat up to inside walls of the circumferential cutter next in sequence in the direction of rotation, and decreasing continuously. As practical tests have show, the cylindrical bit according to the invention is characterized by much better chip removal, since all the chip removal surfaces are smooth and blend continuously with one another, thus eliminating any angular spaces in which chips can break and stick. The cylindrical bit is consequently much easier to use, requires less pressure, and provides higher cutting performance, leading overall to a situation in which deeper holes whose depth is a multiple of the axial height can be made in one work step. In addition only slight heating of the cylindrical bit occurs, so that a service life of the cylindrical bit is increased.

According to the invention, the space between the chip surface and the opposite side wall of the chip channel can be between one-seventh and one-tenth of the circumference of the drilling head, so that for bits with a diameter of 30 to 40 mm, the space between the chip surface and the opposite chip channel side wall is preferably about one-eighth of the circumference of the bit. By this measure, in comparison to known cylindrical bits, greater clearance is provided for the chip channels, something that is also advantageous as far as chip removal is concerned.

In accordance with further advantageous features of the invention, the exposed surfaces of the main cutters can be tilted at an angle of approximately 30° with respect to the axis of the shank. Provision can also be made such that each chip channel projects inwardly into the bit with respect to its corresponding main cutter, and the curved bottom of the chip channel projects into the free surface of the respective, other main cutter. As a result, the free surfaces terminate as ramps descending at an angle directly into the chip channels, so that no chip material can accumulate even in the spaces that are above the free surfaces.

According to other features of the invention, the generatrix of the cylindrically curved chip channel bottom, viewed in projection on the plane that is spanned by the corresponding main cutter and the axis of the shank, can preferably be inclined at an angle of about 40° relative to the axis of the shank.

The cylindrical bit according to the invention can be formed with unfaceted main cutters and circumferential cutters, so that wet grinding can be eliminated or reduced to a minimum.

The cylindrical bit according to the invention can be manufactured on conventional milling machines, with the workpiece being machined in the usual way in different clamping positions and with a plurality of different tools, but this results in a relatively expensive manufacturing process.

To reduce the manufacturing costs, according to the present invention, a new method of manufacturing such cylindrical bits is proposed, characterized by a workpiece or blank being clamped in a three- or four-axis machining center and, while retaining this clamped position, is machined by a single tool, for example, an end mill, so that first one of the chip channels, then the free surface of the main cutter not associated with the chip channel, then the centering tip, on two sides, and finally the inside wall of the circumferential cutter abutting the free surface are mills, whereupon the workpiece is indexed by 180°, in other words, the clamping device is rotated through 180° and the above defined milling steps are repeated to form the second chip channel, the second free surface, the finished centering tip, and the second circumferential cutter.

This process of the present invention permits manufacturing bits with constant dimensions and tolerances. Additionally, manufacturing requires much shorter times than before. The higher manufacturing accuracy thus achieved eliminates or minimizes finishing during a grinding operation.

BRIEF DESCRIPTION OF THE DRAWINGS

The subject matter of the invention will now be described in greater detail with reference to the accompanying drawings, wherein:

FIG. 2 is an end view of the cylindrical bit shown in FIG. 1;

FIG. 3 is a side view of the cylindrical bit, taken in the direction of the arrow III in FIG. 2;

FIG. 4 is a side view taken in the direction of the arrow IV in FIG. 2;

Figure 1:
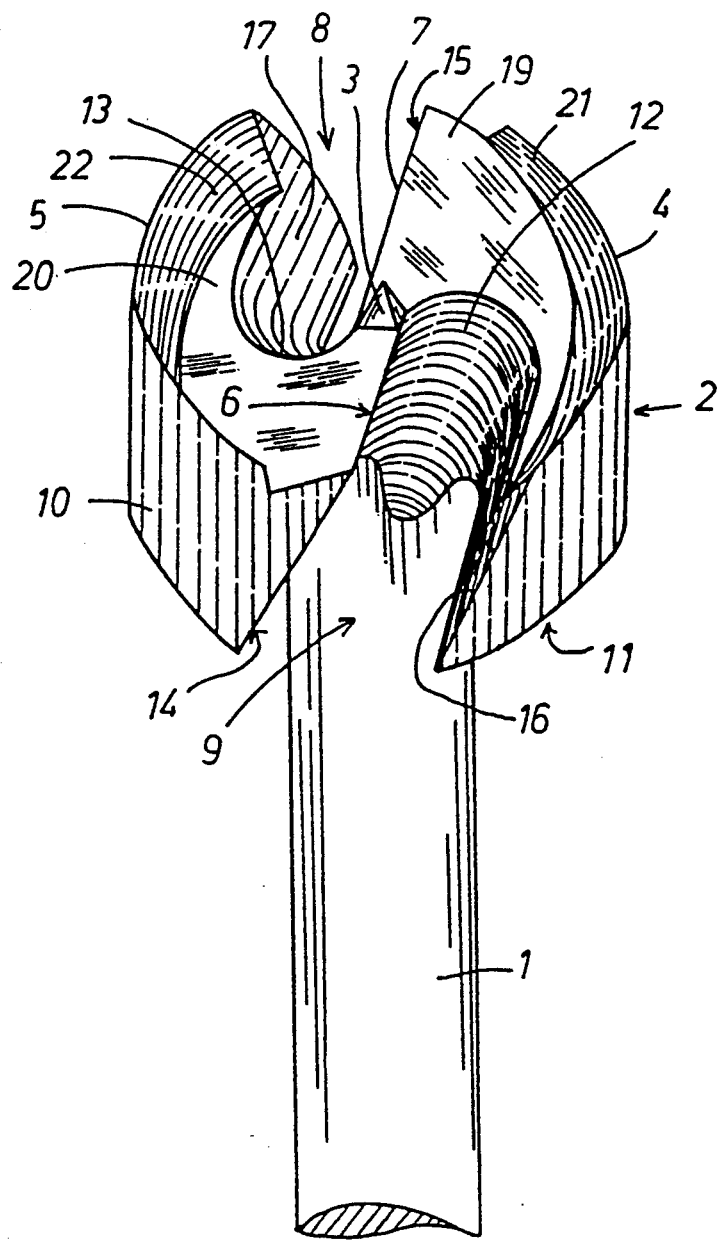
FIG. 1 is a perspective schematic view of a cylindrical bit of the so-called Forstner bit.

DETAILED DESCRIPTION:

The cylindrical bit shown in FIGS. 1-4 has a drill head 2 supported by a shank 1, with the drill head 2 being provided with a centering tip 3, two circumferential cutters 4, 5, two main cutting edges 6, 7 extending approximately radially, and two chip channels 8, 9 associated with main cutting edges 6, 7. The chip channels 8, 9 are open in a direction of a circumferential surface 10 and toward the rear surface 11 of the drill head 2. The bottom surface 12, 13 of the respective chip channels 8, 9 is rounded in an arcuate or cylindrical form and blends continuously with the chip surfaces 14, 15 of the respective cutting edges 6, 7 and also with the chip channel side walls 16, 17 opposite the chip surfaces 14, 15. The chip channels 8, 9 are inclined relative to a longitudinally extending central plane 18 extending parallel to the main cutting edges 6, 7 as shown most clearly in FIG. 2. The distance between the chip surfaces 14, 15 and the respective chip channel side walls 16, 17 opposite the chip surfaces 14, 15 in the embodiment of FIGS. 1-4 is approximately one-eighth of the circumferential length of the drill head 2.

Free surfaces 19, 20 slope evenly and continuously toward inside or inner walls 21, 22 of the successive circumferential cutters 4, 5 in a direction of rotation of the cylindrical bit, with the free surfaces 19, 20 being inclined with respect to a transverse plane 23 of the drill head 2 by an angle a of approximately 30°. Each of the chip channels 8, 9 project inwardly in the direction of the drill head 2 relative to its respective main cutting edges 6, 7 and the arcuate bottom surfaces 12, 13 of the chip channels 8, 9 project, in each case, as far as the free surface 19, 20 of the other main cutting edges 6, 7. As shown most clearly in FIG. 4, a generatrix 24 of the arcuate or cylindrically curved bottom surface 12, 13 as viewed in a projection onto the plane spanned by the respective main cutting edges 6 or 7 and the axis 25 of a shank 1, is inclined at an angle b of approximately 40° with respect to the center axis 25 (FIG. 4) of the shank 1. Main cutting edges 6, 7 and circumferential cutters 4, 5 are unfaceted in the illustrated embodiment.

As shown most clearly in FIG. 1, all of the spaces machined in the cylindrical drill head 2, for example, the two spaces above the free surfaces 19, 20 and the spaces formed by the chip channels 8, 9, are provided with smooth walls, and corners or angles would chips could accumulate are avoided.

Figure 5:
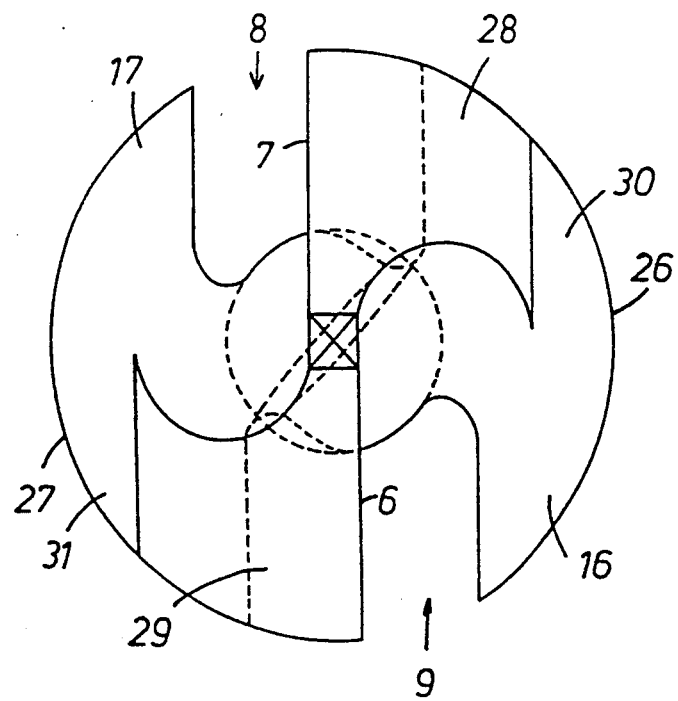
FIG. 5 is an end view of another embodiment of the present invention, a so-called multi-spur machine bit.
Figure 6:
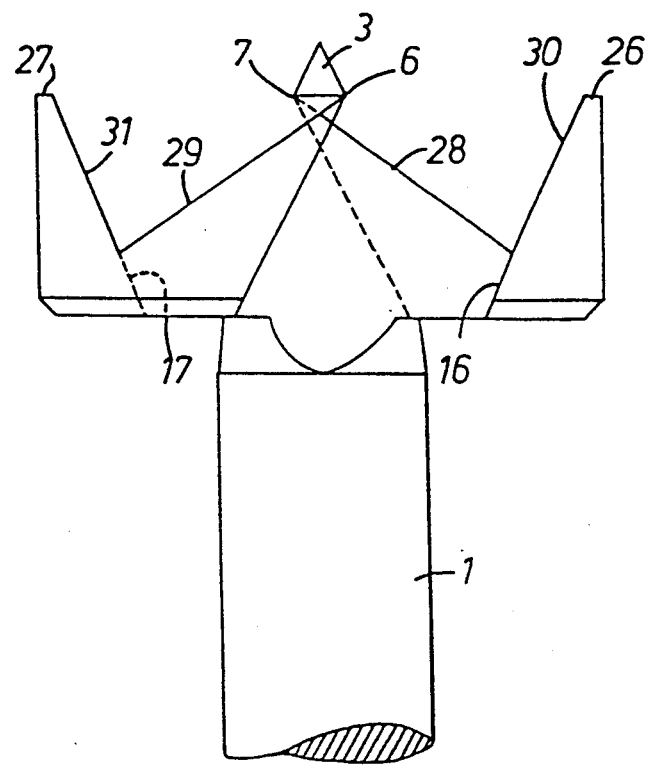
FIG. 6 is a side view of the cylindrical bit according to FIG. 5.

In the embodiment of FIGS. 5 and 6, a so-called multispur machine bit is proposed which differs from the embodiment of FIGS. 1-4 in that circumferential cutters 26, 27, corresponding to the precutters of such multispur machine bits, are made much shorter. Free surfaces 28, 29 are larger, and inside walls 30, 31 of the circumferential cutters 26, 27 blend smoothly into chip channel side walls 16, 17.

Figure 7:
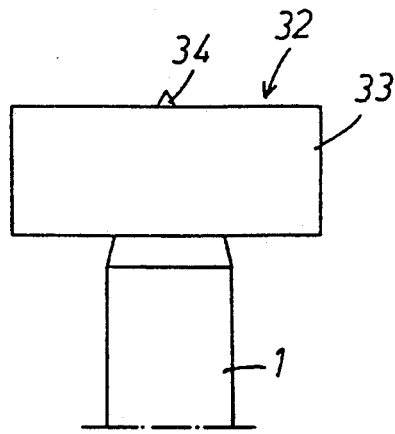
FIGS. 7-12 are schematic views depicting a cylindrical bit in six successive manufacturing stages for a cylindrical bit constructed in accordance with the present invention.
Figure 8:
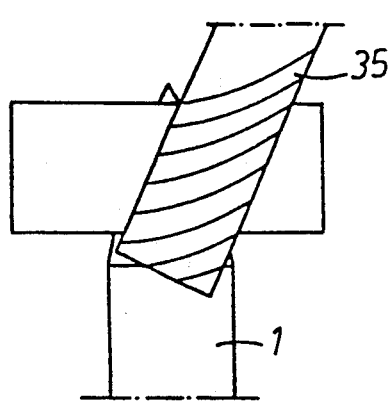
Figure 9:
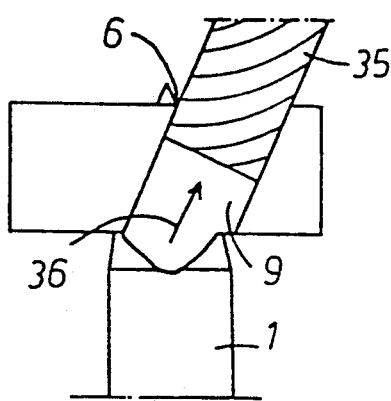
Figure 10:
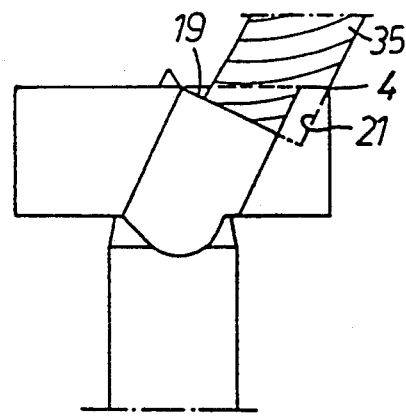
Figure 11:
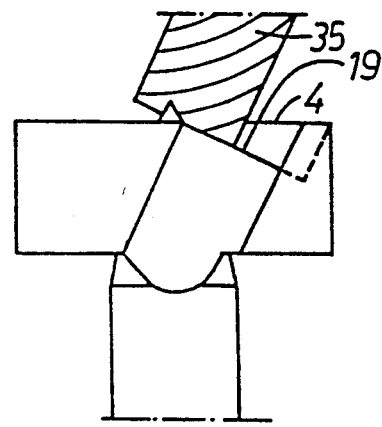
Figure 12:
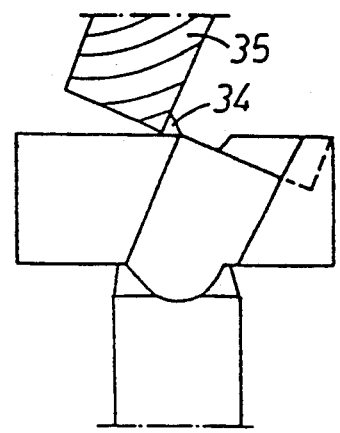

To manufacture cylindrical bits of the embodiment of FIGS. 5, 6, which are rotationally symmetrical through 180°, the process begins with a workpiece 32 as shown in FIG. 7, in which the bit is still in the form of a complete cylinder 33 and centering tip 34 is conical. Workpiece 32 is gripped by its shank in an indexer of a machining center, with provision for adjusting the tool around a plurality of axes. A shaft or end mill 35 is used as the tool. In the first work step (FIG. 8), end mill 35 is introduced vertically perpendicular to the plane of the drawing of FIG. 8, starting at the edge of the complete cylinder 33, until the end mill 35 reaches the shank 1. Upon reaching the shank 1, an upward movement in the direction of arrow 36 (FIG. 9) is superimposed on the inward movement of the end mill 35, so that a first chip channel 9 with a rounded chip channel bottom 12 and main cutting edge 6 are formed. In subsequent steps shown in FIGS. 10 and 11, end mill 35 is used to form a free surface 19 and inside wall 21 of a circumferential cutter 4 as well as the circumferential cutter 4 itself. Then the end mill is used to machine two sides of the centering tip 34 to make them flat (FIG. 12). Then end 35 is moved away and Workpiece 32 is indexed through 180°, in other words its clamping device is rotated through 180°. Then the milling steps shown in FIGS. 8 to 12 are performed on the opposite side of the head 2, with the second chip channel 8 with the main cutter 7, second free surface 20, and second inside wall 22 with second circumferential cutter 5 being machined and the centering tip being finished in a pyramidal fashion. As shown in FIGS. 8 to 12, main cutting edges 6 and 7 and circumferential cutters 4, 5 are milled directly into their final shapes, so that no facets need to be ground and only minor finishing work is still required.

I claim:

1. Cylindrical bit machined in one piece from solid material, the cylindrical bit comprising a drill head supported on a shank, said drill head including a centering tip and two circumferential cutters, two main cutting edges extending substantially radially, and two chip channels associated with the main cutting edges, said chip channels opening in a direction of a circumferential surface and a rear face of said drill head, wherein a bottom surface of the respective chip channels is rounded in an arcuate fashion and respectively blends continuously with a chip surface of the respective main cutting edges and with a respective chip channel side wall disposed opposite to the respective chip surfaces, and wherein free surfaces of the respective main respective cutting edges are flat as far as inner walls of the successive circumferential cutters as viewed in a rotational direction of the cylindrical bit, with the respective inner walls sloping continuously in a direction toward a longitudinal center axis of the shank.

2. Cylindrical bit according to claim 1, wherein a space between the respective chip surfaces and an oppositely disposed chip channel side wall is approximately one-seventh to one-tenth of a circumference of the drill head.

3. Cylindrical bit according to claim 2, wherein the cylindrical bit has a diameter of between 30 to 40 mm, with a space between the respective chip surfaces and an opposed chip channel side wall is approximately one-eighth of a circumference of drill head.

4. Cylindrical bit according to one of claims 1 to 3, wherein the free surfaces of the respective main cutting edges are inclined at an angle of approximately 30° with respect to a transverse plane of the drill head.

5. Cylindrical bit according to one of claims 1, 2 or 3, wherein each chip channel projects inwardly beyond its respective main cutting edge, and wherein the bottom surface of the respective chip channels project as far as the respective free surfaces of the opposite main cutting edges.

6. Cylindrical bit according to claim 4, wherein a generatrix of the bottom surfaces of the respective chip channels, as viewed in a projection on a plane spanned by the corresponding main cutting edges and a longitudinal center axis of the shank is inclined at an angle of approximately 40° to the longitudinal center axis of the shank.

7. Cylindrical bit according to one of claims 1, 2, or 3, wherein the main cutting edges and two circumferential cutters are unfaceted.

* * * * *

UNITED STATES PATENT AND TRADEMARK OFFICE
CERTIFICATE OF CORRECTION

PATENT NO. : 5,312,207
DATED      : May 17, 1994
INVENTOR(S) : Thomas POMP

It is certified that error appears in the above-identified patent and that said Letters Patent is hereby corrected as shown below:

On the title page, item
[73]  Assignee:   Famag-Werkzeugfabrik Friedr. Aug
                 Mühlhoff, Remscheid, Fed. Rep. of
                 Germany Signed and Sealed this Sixth Day of September, 1994

Attest:

BRUCE LEHMAN

*Attesting Officer*         *Commissioner of Patents and Trademarks*